United States Patent [19]
Hoppe et al.

[11] 3,884,169
[45] May 20, 1975

[54] MARGINAL ZONE REINFORCING SYSTEM FOR THE PRODUCTION OF HEAVY DUTY FOAM RESIN CONSTRUCTIONS

[75] Inventors: Peter Hoppe, Troisdorf; Gustav Drouven, Bensberg; Helmut Leyer, Opladen; Johann Müller, Cologne, all of Germany

[73] Assignee: Bayer Aktiengesellschaft, Leverkusen-Bayerwerk, Germany

[22] Filed: July 13, 1972

[21] Appl. No.: 271,222

[30] Foreign Application Priority Data
July 13, 1971 Germany............................ 21348538

[52] U.S. Cl. ........................ 112/420; 28/77; 161/53; 161/67
[51] Int. Cl.............................. B32b 7/08; B29d 3/02
[58] Field of Search ........ 112/420, 410; 161/62, 53, 161/67, 69, 161; 28/72.2 R, 77; 264/45, 257

[56] References Cited
UNITED STATES PATENTS

| | | | |
|---|---|---|---|
| 2,815,558 | 12/1957 | Bartovics et al. | 161/62 X |
| 3,293,723 | 12/1966 | Evans | 161/62 X |
| 3,591,444 | 7/1971 | Hoppe | 161/53 |

Primary Examiner—Werner H. Schroeder
Attorney, Agent, or Firm—Plumley & Tyner

[57] ABSTRACT

A marginal zone reinforcing system for the production of heavy duty sandwich constructions consisting of a three layer matting of (a) a web or mat, (b) a fiber fleece of fine fibers and (c) a fiber fleece of coarse fibers, the layers being bonded by medling.

9 Claims, 1 Drawing Figure

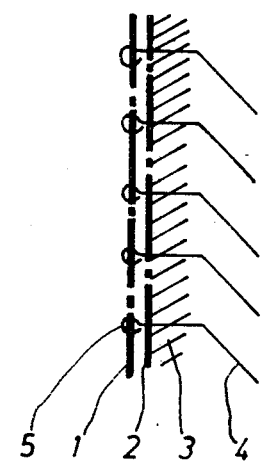

MARGINAL ZONE REINFORCING SYSTEM FOR THE PRODUCTION OF HEAVY DUTY FOAM RESIN CONSTRUCTIONS

This invention relates to a marginal zone reinforcing system for the production of high load sandwich constructions comprising foam support cores and for the production of high load foamed articles, in which the reinforcing system consists of several fibrous layers.

Marginal zone reinforcing systems for the production of high load foamed constructions are known which systems consist of fibre fleeces in which coarse synthetic fibres, preferably polyamide fibres, are used for producing the fleeces.

In the marginal zone reinforcing system according to the invention, the layer components (woven fabrics and/or non-woven mats and fleeces) are arranged in a particular way such that when the composite fibre system is viewed in cross-section the density of the fibres is seen to decrease from one surface to the other, that is to say that the individual components of a marginal zone reinforcing system used, for example, for reinforcing a foam resin moulding take up the following positions, starting from the surface of what will subsequently be the foam resin body: (a) a layer composed of one or more layers of woven fabrics and/or mats, (b) a layer consisting of one layer of fibrous fleece made of fine fibres and (c) a layer consisting of one layer of fibrous fleece made of coarse fibres.

All these various components (woven fabrics and/or mats and the two layers of fleece) are joined together to form a composite system by stitching.

It is an object of this invention, therefore, to provide a marginal zone reinforcing system for the production of high load sandwich constructions having a foam support core and for the production of foam constructions, which comprises a carpet consisting of (a) a layer consisting of one or more layers of webs or mats, (b) a layer consisting of a fibre fleece of fine fibres and (c) a layer consisting of a fibre fleece of coarse fibres, said layers (a), (b) and (c) being bonded together by stitching, the density of said layers (a) to (c) decreasing across the cross-section of said carpet.

In finished foam bodies provided with these surface reinforcing systems, the layers of woven fabrics or mats or combinations thereof impregnated with unsaturated polyester resin, epoxide resin, polyurethane or similar compounds take up the stresses which are normally borne by glass fibre resin systems. The fleece components which are permeated with foam in the foaming process both strengthen the external zone of foam core and anchor the whole stress bearing composite fibre system of the article to the interior of the non-reinforced support core.

The woven fabrics or mats of layer (a) may be made of glass fabrics, asbestos fabrics (or mats) or synthetic fabrics having weights per layer of 80 – 800 g/m$^2$ or more or combinations thereof, and may be combined with additional metal fabrics.

The fleece of fine fibres of layer (b) is preferably made of synthetic fibres, for example polyacrylonitrile, polyester or polyamide fibres, having a titre of 2 to 10 dtex and a weight per m$^2$ of 100 to 500 g, the weight depending on the kind of stress to which the foam core surface which is to be reinforced is likely to be subjected. If a composition of fleeces as described above is used the zone of foam core reinforced by the fleece has a density of up to 0.4 g/cm$^3$ and elastic moduli $\geqq$ 10,000 kg/cm$^2$ when the fleece has been permeated with foam. As a result of this fibrous reinforcement the zone contributes to a very substantial extent to the mechanical stability of the covering layer which is composed of glass fibre resin.

The fleece of coarse fibres of layer (c) may be made of coco fibres or synthetic fibres, preferably polyamide fibres, and in the case of polyamide fibres especially it should have a titre of $\geqq$ 60 dtex and a weight per m$^2$ of 70 to 150 g. In the finished foam core product, this fleece of the fibrous reinforcing system serves as an anchoring system by means of which the highly stressed surface of the reinforced foam structure is anchored to the interior of the support core.

The best method of manufacture of the composite fibre system according to the invention for the production of high load sandwich constructions having foam support cores or for producing foam constructions is by known processes, for which the accompanying drawing shows a preferred embodiment. The two layers of glass fibre fabric 1 and 2 each having a weight of 400 g/m$^2$, the fleece of fine fibres 3 made of polyamide-6 fibres having a titre of 5 dtex and a weight of 200 g/m$^2$ and the fleece of coarse fibres 4 made of crimped polyamide-6 fibres having a titre of 80 dtex and a weight of 80 g/m$^2$ are bonded together by stitching threads 5. The threads used for stitching are the same as those used for the production of the coarse fibred fleece.

The following example shows the method of manufacture of a high load sandwich construction, using a marginal zone reinforcing system according to the invention:

a. Coating the mould for foaming with mould parting agent.

b. Introducing (by brush coating or spraying) a gel coat layer (e.g. 300 g/m$^2$) which may or may not be coloured based on an unsaturated polyester resin which may be polymerised in 5 to 15 minutes, according to the composition.

c. Introducing (by brush coating or spraying) an impregnating resin (e.g. 800 g/m$^2$) based on an unsaturated polyester resin.

d. Applying a carpet of fibres in which the density varies in accordance with the invention, so that the fabric or mat component of the carpet has a weight of 800 g/m$^2$ and placing this carpet-component of the fibrous reinforcing system on the "wet" undercoat of impregnating resin.

e. Covering the internal surface of the mould, after it has been treated by steps a–d, with a vacuum cloth or if necessary with a prefabricated contoured vacuum preform based, for example on polyurethane elastomers.

f. Applying a vacuum achieve between the fibrous system and the vacuum preform, whereby the fabric or mat component (800 g/m$^2$) of the marginal zone reinforcing system is completely permeated by the 800 g/m$^2$ polyester resin and freed from air.

The vacuum is applied until the impregnating resin has completely polymerised. This requires 10 to 15 minutes according to the composition of the polyester impregnating resin and the size of the unit which is to be produced.

g. Lifting of the vacuum preform.

h. Closing the foam mould and introducing the foam resin reaction mixture based e.g. on polyurethane into the closed foam mould. The quantity of foamable polyurethane resin reaction mixture introduced depends on the size of the product which is to be produced and the desired final unit weight of the foam resin product, and the reaction mixture should as far as possible be introduced in one single operation.

The foamable polyurethane resin reaction mixture should be formulated so that, for example, the process of introducing the reaction mixture is completed after 20 seconds, the whole cavity of the mould is filled with a still creamy, liquid foam after a further 40 seconds and the desired hydrostatic foaming pressure (1–3 excess atmospheres) which causes complete permeation of the fine and coarse fibrous layers and thereby effects the desired variation in density of the fibre reinforced foam resin surface is produced within a further 30 to 60 seconds.

A marginal zone reinforcing system as described above is of great importance for the construction of vehicles, in ship building, in boat building, for constructional units used in the building of houses and for container construction.

What we claim is:

1. In a construction comprising a foam layer having an outer skin and a marginal zone reinforcing system bonded to the foam layer and disposed inwardly of said outer skin; the improvement which comprises, as the reinforcing system, a single multi-layer carpet consisting of
   a. a layer consisting of at least one material selected from the group consisting of mats and webs, positioned adjacent said outer skin;
   b. a layer consisting of a fiber fleece of fine fibers, positioned adjacent layer (a); and
   c. a layer consisting of a fiber fleece of coarse fibers positioned adjacent layer (b) and said foam core;
   said layers (a), (b), and (c) being secured together by threads, the density of said layers (a), (b), and (c) decreasing from layer (a) to layer (b) to layer (c) of said carpet whereby improved strength characteristics are imparted to said construction.

2. The marginal zone reinforcing system of claim 1, wherein said layer (a) consists of fibres selected from the group consisting of glass fibres, synthetic fibres, combinations thereof, and combinations of said fibres with metal fibers.

3. The marginal zone reinforcing system of claim 1, wherein said layer (b) consists of a fibre fleece of fine fibres consisting of synthetic fibres having a titre of 2–10 dtex, said fleece having a weight per $m^2$ of 100 to 500 g.

4. The marginal zone reinforcing system of claim 3, wherein said synthetic fibers are selected from the group consisting of fibers of polyacrylonitrile, fibers of polyester and fibers of polyamide.

5. The marginal zone reinforcing system of claim 1, wherein said layer (c) consists of a fibre fleece of coarse fibres consisting of coco fibers or polyamide fibres, said fibre fleece having a weight per $m^2$ of 70 to 150 g.

6. The marginal zone reinforcing system of claim 5, wherein said fiber fleece consists of polyamide fibers, having a titre of $\geq 60$ dtex.

7. The marginal zone reinforcing system of claim 1, said stitching being comprised by the same threads as used for the production of said fleece of said layer (c).

8. In a reinforcing system for the marginal zones of a high-load sandwich construction comprising a foam core having an outer skin and a marginal zone reinforcing system comprising a laminate, bonded to the foam core and disposed inwardly of said outer skin; the improvement which comprises as the said laminate a single multi-layer carpet consisting of
   a. a layer consisting of at least one material selected from the group consisting of mats and webs, positioned adjacent the outer skin;
   b. a layer consisting of a fiber fleece of fine fibers, positioned adjacent layer (a); and
   c. a layer consisting of a fiber fleece of coarse fibers positioned adjacent layer (b) and the foam core;
   said layers (a), (b), and (c) being secured together by stitching, the density of said layers (a), (b), and (c) decreasing from layer (a) to layer (b) to layer (c) of said carpet whereby improved strength characteristics are imparted to said construction.

9. The construction of claim 1 wherein said foam layer is the core of a sandwich construction.

* * * * *